United States Patent [19]

Queen et al.

[11] 4,123,313
[45] Oct. 31, 1978

[54] APPARATUS FOR MAKING A COMPOSITE FABRIC

[75] Inventors: David S. Queen, Sanquhar; Peter W. Bell, Beith; Thomas H. Dick, Dundee; John B. Edgar, Giffnock, all of England

[73] Assignee: Sidlaw Industries Limited, London, England

[21] Appl. No.: 839,566

[22] Filed: Oct. 5, 1977

Related U.S. Application Data

[60] Continuation of Ser. No. 631,917, Nov. 14, 1975, abandoned, which is a division of Ser. No. 439,931, Feb. 5, 1974, Pat. No. 3,953,269.

[30] Foreign Application Priority Data

Feb. 19, 1973 [GB] United Kingdom ............... 6997/73

[51] Int. Cl.$^2$ .......................................... B32B 3/26
[52] U.S. Cl. ........................... 156/498; 156/361; 156/499; 156/500; 156/549; 156/555
[58] Field of Search ............... 156/72, 435, 555, 547, 156/549, 551, 361, 351, 182, 78, 79, 243, 246, 500, 501, 311, 242, 498, 322, 499, 578; 428/310, 315, 311; 425/371, 374, 364 R; 264/45.6, 213, 257

[56] References Cited

U.S. PATENT DOCUMENTS

| | | | |
|---|---|---|---|
| 2,706,699 | 4/1955 | Plonsoen et al. | 156/229 |
| 3,067,469 | 12/1962 | Yarrison | 156/498 |
| 3,098,262 | 7/1963 | Wisotzky | 156/322 |
| 3,152,941 | 10/1964 | Sherman et al. | 156/555 |
| 3,328,225 | 6/1967 | Urbanic et al. | 156/79 |
| 3,547,742 | 12/1970 | Cottrell | 156/322 |
| 3,575,754 | 4/1971 | Duerden et al. | 156/231 |
| 3,650,880 | 3/1972 | Tieniben | 156/243 |
| 3,671,365 | 6/1972 | Cover, Jr. et al. | 156/580 |
| 3,712,849 | 1/1973 | Robbiati | 156/324 |
| 3,728,182 | 4/1973 | Wisotzky et al. | 156/72 |

*Primary Examiner*—Douglas J. Drummond
*Assistant Examiner*—Michael W. Ball
*Attorney, Agent, or Firm*—Finnegan, Henderson, Farabow & Garrett

[57] ABSTRACT

Apparatus for manufacturing a composite fabric, including an endless carrier belt having a non-stick surface and traversible over first and second contiguous sets of planar support surfaces. Heating means are provided for heating the first set of planar support surfaces and cooling means for cooling the second set of planar support surfaces. A first means is provided for supplying a relatively thick substrate to the carrier belt in advance of the first set of planar support surfaces which means includes a device for applying deaerated thermoplastics material in liquid form directly to the surface of the carrier belt. A second means supplies pile-forming material and a third means is arranged to receive the pile-forming material that includes a lick roller for coating one surface of said pile-forming material with plastics material in liquid form. A fourth means, including a roller cooperating with one of the planar support surfaces adjacent the junction between the first and second sets of planar support surfaces, applies the coated surface of the pile-forming material under heat to the substrate material.

5 Claims, 9 Drawing Figures

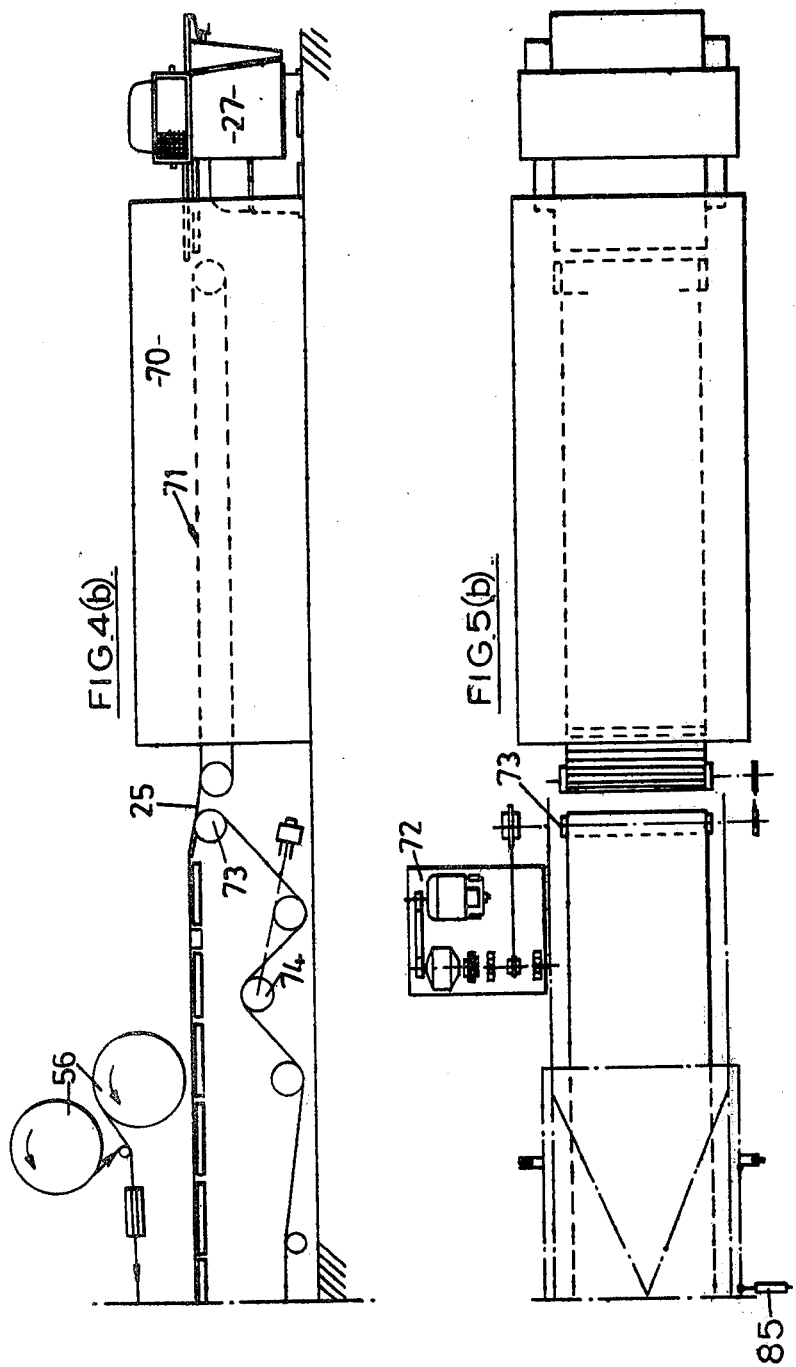

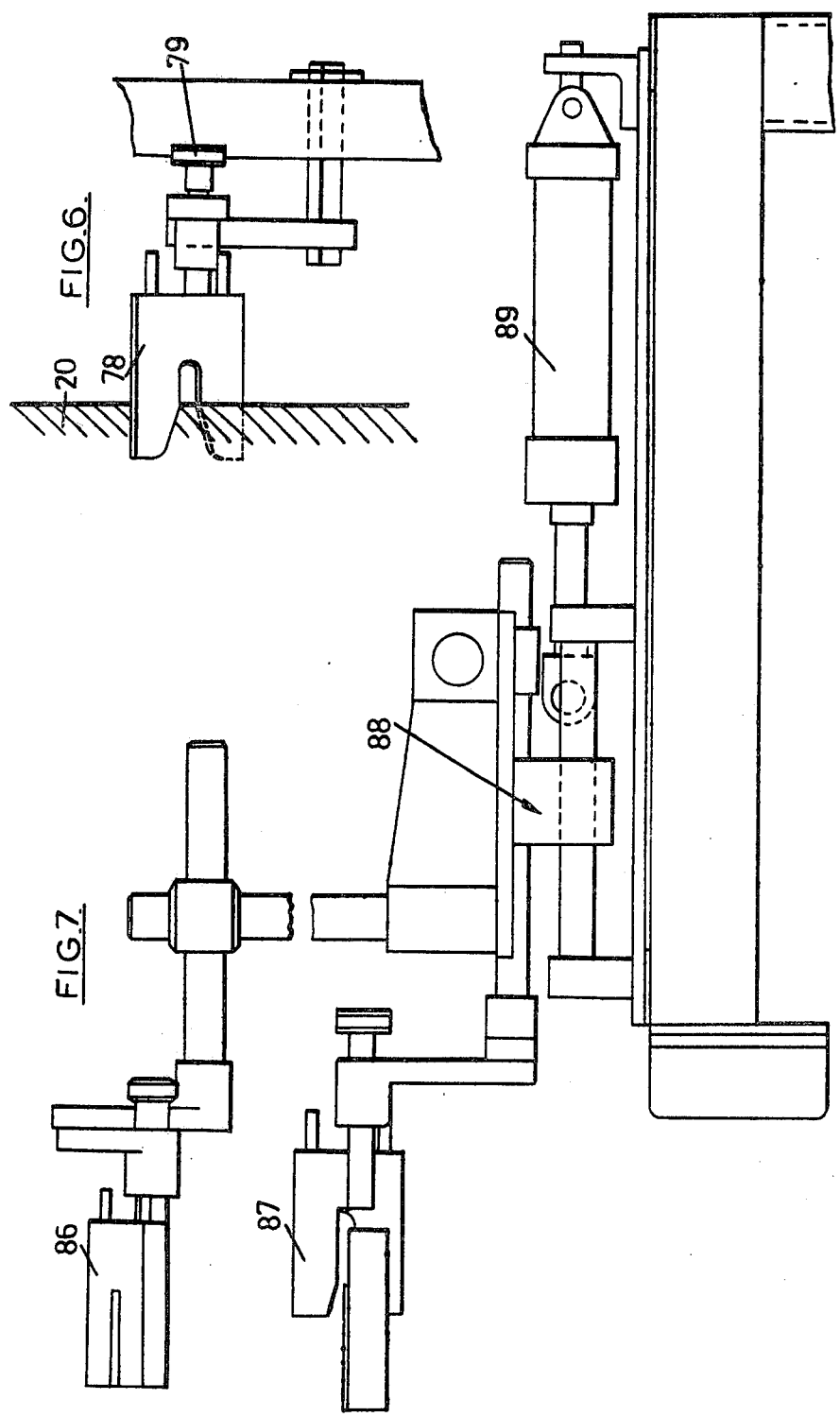

APPARATUS FOR MAKING A COMPOSITE FABRIC

This is a continuation of application Ser. No. 631,917, now abandoned, filed Nov. 14, 1975, which is a divisional application of Ser. No. 439,931, filed Feb. 5, 1974, now U.S. Pat. No. 3,953,269.

This invention relates to composite fabrics and to a method and apparatus for manufacturing a said fabric.

Composite fabrics which are presently available consist of two or more layers of different materials or fabrics joined together either by a stitching technique or by bonding utilising adhesives, and in the latter category are to be found modern floor coverings such as carpet tiles and modern wall coverings.

With the introduction of lightweight fabrics having weight in the range 4-12 oz./sq. yards it has become desirable to support these fabrics on a substrate or base. Melded fabrics, which are of light weight are particularly difficult to bond to a backing layer with conventional adhesives because the adhesive tends to penetrate through the melded fabric and soil the surface of the fabric. Consequently it is an object of the present invention to provide an improved form of composite fabric and a method of bonding a lightweight fabric to a backing layer or substrate in order to produce a composite fabric of commercially viable quality. Another object of the present invention is to provide apparatus capable of carrying out the aforesaid method.

It is also an object of the present invention to provide a method and apparatus for producing a composite fabric from materials of substantially different weights per unit area.

According to the present invention there is provided a composite fabric comprising a layer of lightweight material bonded to a substrate material by an interlayer of foamed thermo-plastics material.

Preferably the substrate material comprises deaerated thermo-plastics material which may incorporate a layer of fibrous material such as glass-fibre scrim.

Further according to the present invention there is provided a method of manufacturing a composite fabric comprising coating one surface of a web of lightweight material with a layer of foamed thermo-plastics material, applying the coated surface of the lightweight material to a substrate material, heating the foamed thermo-plastics material to effect gellation thereof in order to form a composite fabric.

Further according to the present invention there is provided apparatus for carrying out the method of the preceding paragraph, said apparatus comprising means for supplying lightweight material from a supply station to a device for applying foamed thermo-plastics material to a surface of said lightweight material, means for supplying a substrate material and means for applying said substrate material under heat to the coated surface of the lightweight material.

Different aspects of the present invention will now be described by way of example with reference to the accomapnying drawings which illustrate specific exemplary embodiments and in which.

Figure 2:
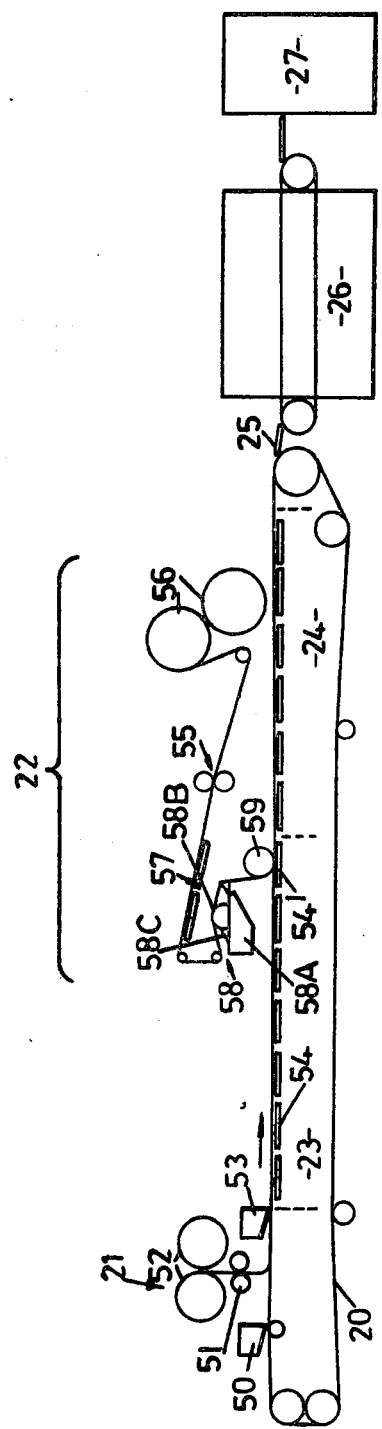
FIG. 2 is a diagrammatic view of apparatus for manufacturing the fabric of FIG. 1.
Figure 4A:
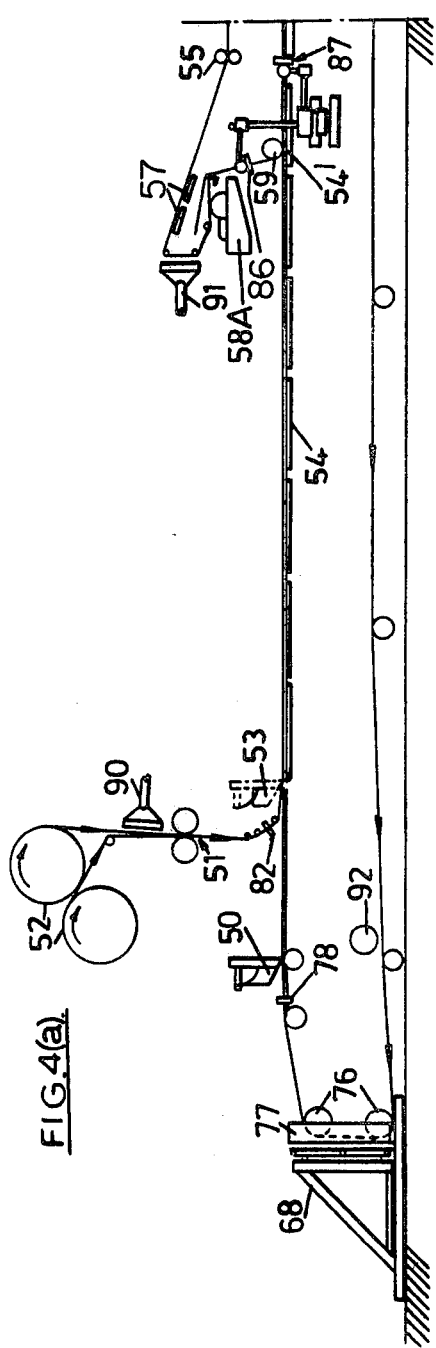
Figure 5A:
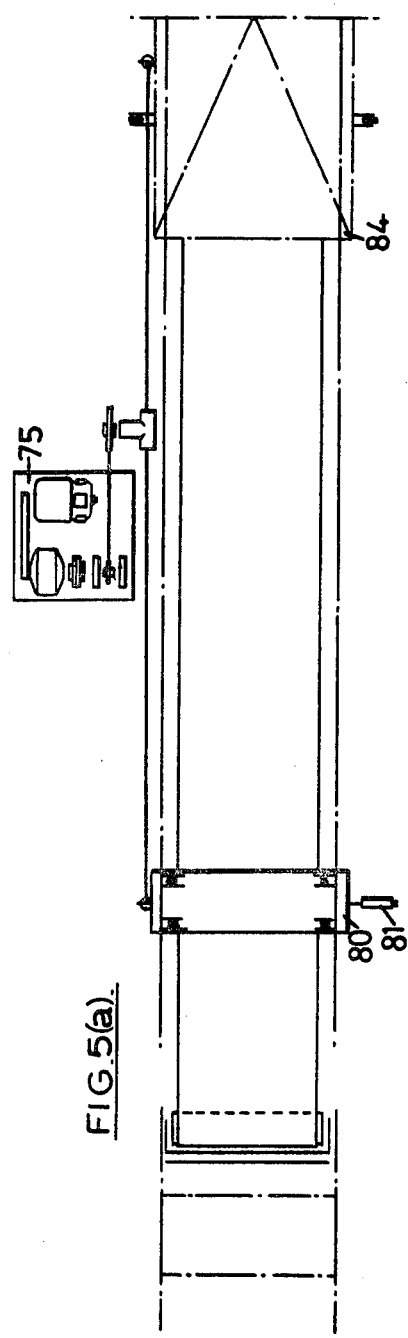

FIGS. 4a and 4b together form a view similar to FIG. 2 but showing the apparatus in greater detail;

FIGS. 5a and 5b together form a plan view of the apparatus of FIG. 4; and

FIGS. 6 and 7 illustrate different details of the apparatus of FIG. 4.

Figure 1:
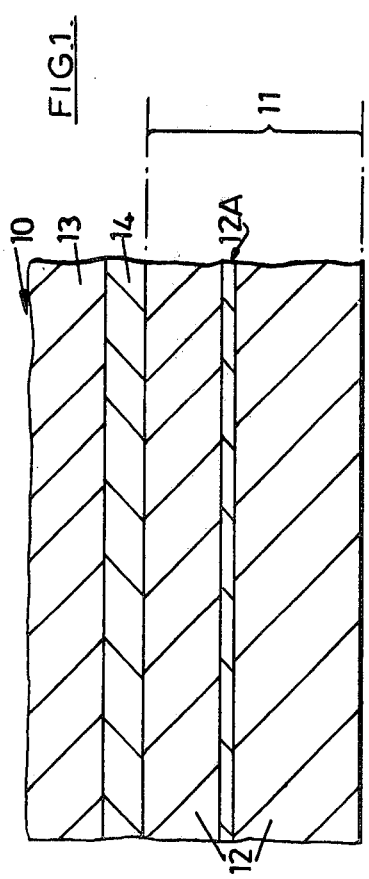
FIG. 1 is a diagrammatic cross-sectional view of a composite fabric in the form of carpeting.

As is illustrated in FIG. 1 the fabric 10 comprises a substrate 11 which is in the form of a gelled layer of heavyweight P.V.C. 12 (of the order 4-10 lbs./sq. yd.) containing a glass-fibre scrim or mat 12A. The lightweight material 13, in this instance, is a melded fabric having a fibre weight of the order of 6-8 oz./sq. yd. and it is bonded to the substrate 11 by means of a layer 14 of foamed thermo-plastics material in a gelled state. Although the scrim 12A has been illustrated as centrally disposed within the thickness of the substrate 11 this is merely for ease of illustration. The scrim 12A may be at any depth within the P.V.C. layer 12 and, conveniently, is arranged to lie just below the upper surface of the P.V.C. layer 12; that is, closely adjacent the interface between the P.V.C. layer 12 and the layer 14.

The apparatus shown in FIG. 2 comprises an endless conveyor belt 20 having a non-stick surface and the upper run of the belt 20 passes under first means 21 where it receives the material to form the substrate 11 of the composite fabric, and subsequently the belt passes a second means 22 where it receives the layers 13 and 14 of the fabric. The layers 13 and 14 are applied simultaneously to the substrate 11 within a heating zone 23 and subsequent movement of the belt 20 carries the materials thereon through a primary cooling zone 24 at the output of which the formed composite fabric is stripped from the belt by means 25 and is passed through a secondary cooling zone 26 to a tile cutting device 27.

The first means 21 comprises an applicator 50 which incorporates a doctor blade and which is arranged over a belt-supporting roller to spread deaerated thermo-plastics material onto the belt 20, driven nip-rollers 51 arranged to pull glass-fibre scrim from one of two supply rolls 52 and to lay the scrim onto the thermo-plastics material, and a second applicator 53, the use of which is optional, to spread a layer of deaerated thermo-plastics material on top of the glass fibre scrim so as to form the substrate 11.

The heating zone 23 is formed by a plurality of flat heating plates 54, in this case seven, each having a machined upper surface and incorporating an electric resistive heating element and these plates are arranged to be adjustable for level so as to provide sufficient heat whereby by the time the substrate 11 reaches the last heating plate 54' the thermo-plastic content of the substrate is in a gelled conditon. At this point the second means 22 applies to the substrate 11 the layers 13 and 14.

The primary cooling zone 24 includes six individually adjustable water-cooled plates having a machined upper surface in order to maintain good contact with the belt 20. The water supply to the plates is from a refrigeration unit (not shown).

The second means 22 comprises driven nip rollers 55 which feed a supply of the lightweight material forming the layer 13 from one of two supply rolls 56, a pair of heating elements 57 over which the material is fed in order to drive off excess moisture therefrom, an applicator 58 for applying foamed thermo-plastics material to the material and a driven lamination roller 59 which co-operates with the last heating plate 54' to apply the material forming the layers 13 and 14. The applicator 58 comprises a trough 58A containing aerated thermoplastics material a driven lick roller 58B which co-operates with the material forming the layer 13 and a doctor blade 58C which co-operates with the roller 53B to ensure a uniform foam coverage thereof.

Figure 3:
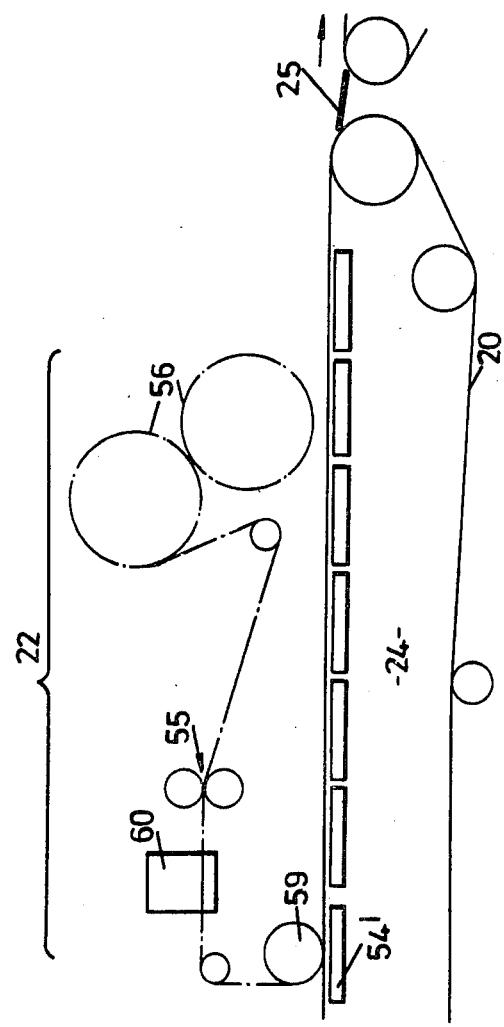
FIG. 3 illustrates a modified version of a detail of FIG. 2.

FIG. 3 shows a modification of the applicator of FIG. 2 and comprises a trough 60 containing a doctor blade, the lightweight material being fed through the trough 60 to receive its coating of thermo-plastics foam.

The apparatus of FIG. 2 is shown in greater detail in FIGS. 4a, 4b, 5a and 5b from which it can be seen that the secondary cooling zone 26 comprises a chamber 70 through which refrigerated air supplied from a refrigerating unit (not shown) is passed and the composite material is conveyed on a slatted conveyor 71 to achieve maximum cooling of the substrate 11. Conveniently the conveyor 71 runs slightly faster than does the belt 20, by say 5%. A maximum belt speed of 25 ft./min. is envisaged.

The belt 20, which may be made of P.T.F.E. coated glass fibre, is operated from a main drive belt unit 72, through a main drive roller 73, tension being maintained in the belt by a weighted tension roller 74 from which a tachometer output is taken in order to synchronise the speed of a secondary drive unit 75. The unit 75 drives the laminating roller 59, the nip rollers 55, the lick roller 58B and the nip rollers 51.

In order to maintain the location of the upper run of the belt 20 centralised with respect to the longitudinal centre line of the heating zone 23 and the primary cooling zone 24 the end of the belt 20 adjacent the first means 21 is carried by a pair of rollers 76 which are mounted on a yoke 77 which in turn is mounted to permit limited pivotal movement relative to a fixed support 68. The pivotal movement of the yoke 77 is effected by a hydraulic ram (not shown) which is controlled by a pneumatically-operated belt edge sensor 78. The sensor 78, see FIG. 6, is supplied with air at a carefully maintained pressure and operates a control system to maintain the edge of the belt continuously intercepting an air jet the exact location of which is selectively adjustable by means of a vernier adjustment screw 79.

In order to maintain the location of the fibre-glass scrim centralised with respect to the upper run of the belt 20 the lay-on unit, which comprises the nip rollers 51 and possibly also the supply rolls 52, is mounted on a wheeled carrier 80 confined to move on a gantry extending transversely of the belt 20. The carrier 80 is positioned by a hydraulic ram 81 which in turn is controlled by a pneumatically-operated belt-edge sensor 82 similar to the sensor 78, the sensor 82 being mounted, with vernier adjustment, on a fixed support and arranged to sense the position of the edge of the fibre-glass scrim.

In a similar manner the lay-on unit for the lightweight material to form the layer 13 and which comprises the nip rollers 55, the heating elements 57 and the applicator 58, is mounted on a wheeled carrier 84 confined to move on a gantry extending transversely of the belt 20. The carrier 84 is positioned by a hydraulic ram 85 which in turn is operated by a pair of pneumatically-operated sensors 86, 87 each similar to the sensor 78. The sensor 86 is arranged to sense the edge of the lightweight material and is mounted with vernier adjustment on a slide 88 (FIG. 7) which is positioned by a hydraulic cylinder 89 in response to the output from the sensor 87 which is arranged to sense the edge of the belt 20 adjacent the laminating roller 59.

To enable the described apparatus to handle different weights of materials the drive units 72, 75 are each infinitely variable in speed, the laminating roller 59 is movable within limits longitudinally of the belt 20, the means 21 incorporates a vacuum cleaning head 90 and a similar head 91 is provided in the means 22, and the underside of the belt 20 is cleaned by a brush 92.

By virtue of the heat applied to the constituent layers of the composite fabric 10 within the heating zone 23 the thermo-plastic content of the fabric 10 is gelled and after traversing the primary and secondary cooling zones the fabric is cut into lengths as desired. In order to obtain a dimensionally stable product which may be die cut to form carpet tiles the substrate 11 is formed on a substantially flat surface and the heating and primary cooling zones 23, 24 are each formed from a plurality of substantially flat plates. This permits the substrate 11 to be substantially stress-free and substantially dimensionally stable and in order to further improve this stability the fibre-glass scrim 12A is incorporated within the substrate 11.

The lightweight material 13 may be non-woven, needled, bonded or melded or open-weaved in construction, all of which are porous and consequently when 'wetted' from one side tend to become soiled on the other side. This problem has been overcome by utilising a bonding agent in the form of foamed thermo-plastics material which tends to sit on top of the material 13 without substantial penetration.

A foamed thermo-plastics material of the following formulation gives good results:

| Materials | Parts by Weight |
|---|---|
| P.V.C. Homo-Polymer | 56 |
| P.V.C. Co-Polymer | 24 |
| P.V.C. Granular Homo-Polymer | 30 |
| Plasticiser | 80 |
| Calcium Carbonate | 56 |
| Stabiliser | 2 |
| Viscosity Depressant | 2 |
| Foaming Agent | 4 |
| Carbon Black Paste | 1 |

In order to minimise shrinkage of the material 13 during the bonding process the heat applied thereto must be of limited duration and intensity. Conveniently this is achieved by locating the laminating roller 59 over the plate 54' and a heating period of about 10 seconds is sufficient to obtain a good bond between the material 13 and the substrate 11. The heat transfer time may also be minimised if the foamed material is black in colour. Conveniently the material 14 has a density in the range 0.35 to 0.65 gm/cc. at temperatures of less than 35° C. and gells at a temperature of about 140° C. so that it may be used as above described with P.V.C. material forming the substrate and which gells at a temperature within the range 146°–154° C.

Although the material 13 has been described hereinabove as being lightweight the apparatus of the embodiments may successfully be utilised with any combination of weights of materials. Thus, the substrate 11, may or may not include a fibre-glass scrim and may or may not be in the form of a conventional fabric. Likewise the material 13 may be in the form of pile for forming carpeting or other household plenishings usually having a density in the range 12–15 oz./sq. yd.

What is claimed is:

1. Apparatus for manufacturing a composite fabric, comprising first and second contiguous sets of planar support surfaces, an endless carrier belt having a non-stick surface and traversible over said first and second contiguous sets of planar support surfaces, heating means for heating the first set of planar support surfaces, cooling means for cooling the second set of planar support surfaces, first means for supplying a relatively thick substrate to said carrier belt in advance of said first set of planar support surfaces, said first means including a device for applying deaerated thermo-plastics material in liquid form directly to the surface of said carrier belt, second means for supplying pile-forming material, third means arranged to receive said pile-forming material from said second means, said third means including a lick roller for coating one surface of said pile-forming material with plastics material in liquid form, and fourth means including a roller cooperating with one of said planar support surfaces of said first set substantially immediately adjacent the junction between said first and second sets of planar support surfaces for applying said coated surface of the pile-forming material under heat to said substrate material, whereby said coating on said pile-forming material is briefly heated and gelled and immediately thereafter said composite fabric is cooled.

2. Apparatus according to claim 1, wherein said first means further includes a device for embedding a layer of fibrous material in the liquid deaerated thermo-plastics material applied to the surface of the carrier belt.

3. Apparatus according to claim 1, including fifth means constraining lateral movement of the carrier belt within limits with respect to a fixed support, and said first means includes a wheeled carriage movable laterally with respect to the conveyor belt and constrained to apply the substrate centrally of the carrier.

4. Apparatus according to claim 3, wherein said second, third and fourth means are mounted on a wheeled carriage movable laterally with respect to the carrier belt and constrained to apply the pile-forming material centrally of the substrate material.

5. Apparatus according to claim 1, wherein said one planar support surface is the last surface of said first set of planar support surfaces.

* * * * *